(12) United States Patent
Myers et al.

(10) Patent No.: US 8,774,543 B2
(45) Date of Patent: Jul. 8, 2014

(54) ROW NOISE FILTERING

(75) Inventors: Charles Myers, Corvallis, OR (US);
Jeffery Beck, Philomath, OR (US);
Christopher Silsby, Albany, OR (US)

(73) Assignee: Aptina Imaging Corporation, George Town (KY)

( * ) Notice: Subject to any disclaimer, the term of this patent is extended or adjusted under 35 U.S.C. 154(b) by 373 days.

(21) Appl. No.: 13/232,174

(22) Filed: Sep. 14, 2011

(65) Prior Publication Data

US 2012/0195521 A1    Aug. 2, 2012

Related U.S. Application Data

(60) Provisional application No. 61/438,202, filed on Jan. 31, 2011.

(51) Int. Cl.
*G06K 9/40* (2006.01)

(52) U.S. Cl.
USPC ............ 382/254; 382/260; 382/274; 382/275

(58) Field of Classification Search
None
See application file for complete search history.

(56) References Cited

U.S. PATENT DOCUMENTS

| | | | | |
|---|---|---|---|---|
| 6,646,681 | B1 * | 11/2003 | Macy et al. | 348/241 |
| 7,991,239 | B2 * | 8/2011 | Novikov | 382/254 |
| 2003/0190088 | A1 * | 10/2003 | Kobayashi | 382/275 |
| 2010/0039538 | A1 * | 2/2010 | Ikedo | 348/241 |

* cited by examiner

*Primary Examiner* — Stephen R Koziol
*Assistant Examiner* — Timothy Choi

(57) ABSTRACT

Apparatus and a method for processing image data where row data is received corresponding to a target row of pixels and to one or more reference rows of pixels. A target row average is generated based on the target row data and a reference row average is generated for each of the one or more reference rows based on each reference row's respective row data. A row correction value is generated based on the target row average of the target row and the reference row average of the one or more reference rows. Corrected target row data is generated by applying the row correction value to the target row data.

14 Claims, 11 Drawing Sheets

US 8,774,543 B2

ROW NOISE FILTERING

CROSS REFERENCE TO RELATED APPLICATIONS

This application claims priority of U.S. Provisional Patent Application Ser. No. 61/438,202, filed Jan. 31, 2011, which is incorporated herein by reference.

FIELD

The subject invention concerns image row noise and in particular to reducing row noise.

BACKGROUND

An image sensor is a device that converts an optical image into an electronic signal. An image sensor may include an array of pixel sensors organized into rows and columns. The row select lines of each pixel in a row may be tied together and the outputs of each pixel in any given column may be tied together. With only one row selected at a given time, pixels in a column are not competing for the output line.

BRIEF DESCRIPTION OF THE DRAWINGS

For a more complete understanding of the nature and benefits of the invention, reference should be made to the following detailed description taken in conjunction with the accompanying drawings, in which.

DETAILED DESCRIPTION

Row correlated noise may be present in image data generated from image sensors. A cause of such noise may be power supply noise injection into column sampling events in CMOS (complementary metal oxide semiconductor) image sensors. One method for addressing row correlated noise is to reduce the power supply noise in a given system. Although power supply noise reduction may be beneficial, it may not be practical in some cases. For example, limitations on project costs may limit the quality of power supply systems. Additionally, complex systems, such as SOCs (systems on a chip), can create extra power supply noise on an IC (integrated circuit) due to large current spikes at clock transitions which may be unavoidable because many operations are desired to be run in parallel with image sensor readout.

Another method for addressing row correlated noise is to generate a reference sample that closely matches the power supply noise injection and to apply a filter based on the reference sample to the affected row. Reference generation and correction may reduce row noise. Row noise may remain visible, however, because it may be difficult to closely match a reference sample with the exact loading, bandwidth, and sampling instants of the sampling circuits.

Row noise is strongly correlated over a single row, while image data rarely has this behavior. Row noise can be detected and removed with an algorithm that detects strong differences from row to row and removes them. For example, a 2D spatial filter can be used to reduce or remove row noise, however, this may result in image blurring.

It is noted that row averages for most images are comprised of low frequency content from row average to row average. In contrast, images exhibiting row noise often have high frequency content in the row averages. According to an example embodiment of the invention, a filter may be applied to the row averages which rejects high frequency signals in the row direction. In one example embodiment, a spatial filter is applied to row averages to determine desired row averages, a correction value is calculated from the difference between the actual row averages and the desired row averages, and the correction value is then applied to the data in a given row. This method of filtering processes row averages which may result in the blurring of row averages. The blurring of row averages, however, may be less visible to a viewer than blurring caused by filtering the actual row data such as mentioned above, for example, with regard to a 2D spatial filter.

Figure 1:
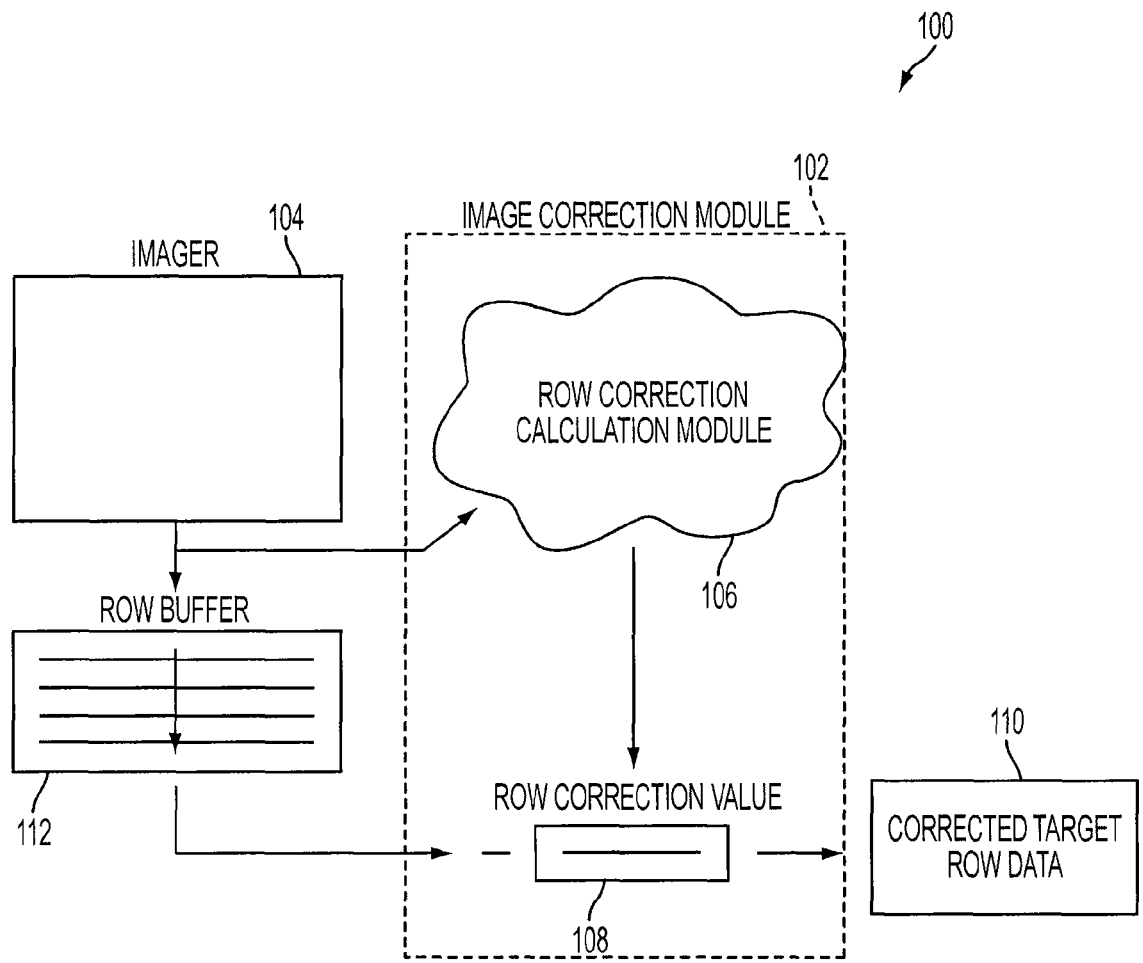
FIG. 1 is a data flow diagram according to an example embodiment of the invention.

A method according to an example embodiment of the invention is described with reference to the data flow diagram 100 shown in FIG. 1. The term "target row" is used to identify a row of an image that is being analyzed and corrected and the term "reference row(s)" is being used to identify one or more rows of an image that are used in the filtering process along with the target row as further described below.

Row data corresponding to pixels in an image is received by an image correction module 102 according to an example embodiment of the invention, directly or indirectly, from an imager 104. In an example embodiment, the image correction module 102 may receive the row data from a memory module (shown in FIG. 11, for example). The row data includes target row data corresponding to a target row of pixels and reference row data corresponding to one or more reference rows of pixels.

The image correction module 102 includes a row correction calculation module 106 for generating a row correction value 108 for a particular target row. The row correction value 108 for a target row is subtracted from the data representing each pixel in the corresponding target row, received from a row buffer 112 in the example shown in FIG. 1, to generate corrected target row data 110. This process may be repeated on a row-by-row basis for multiple rows in an image.

Figure 2:
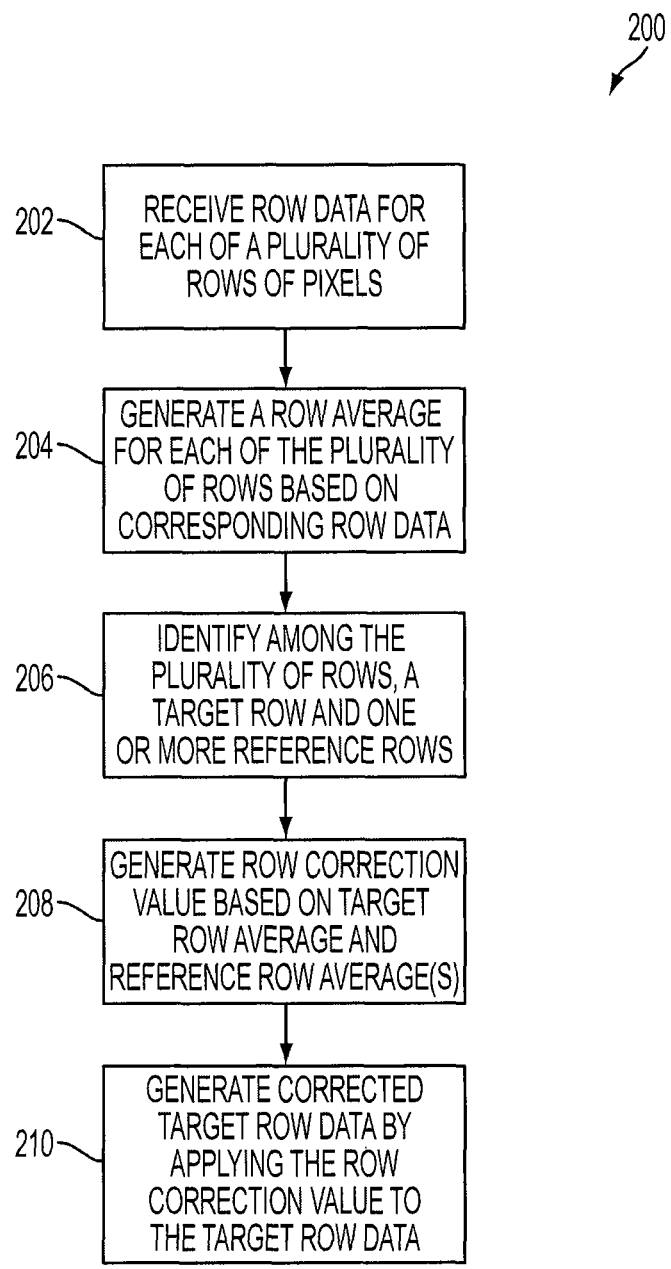
FIG. 2 is a flow chart illustrating a method according to an example embodiment of the invention.
Figure 3:
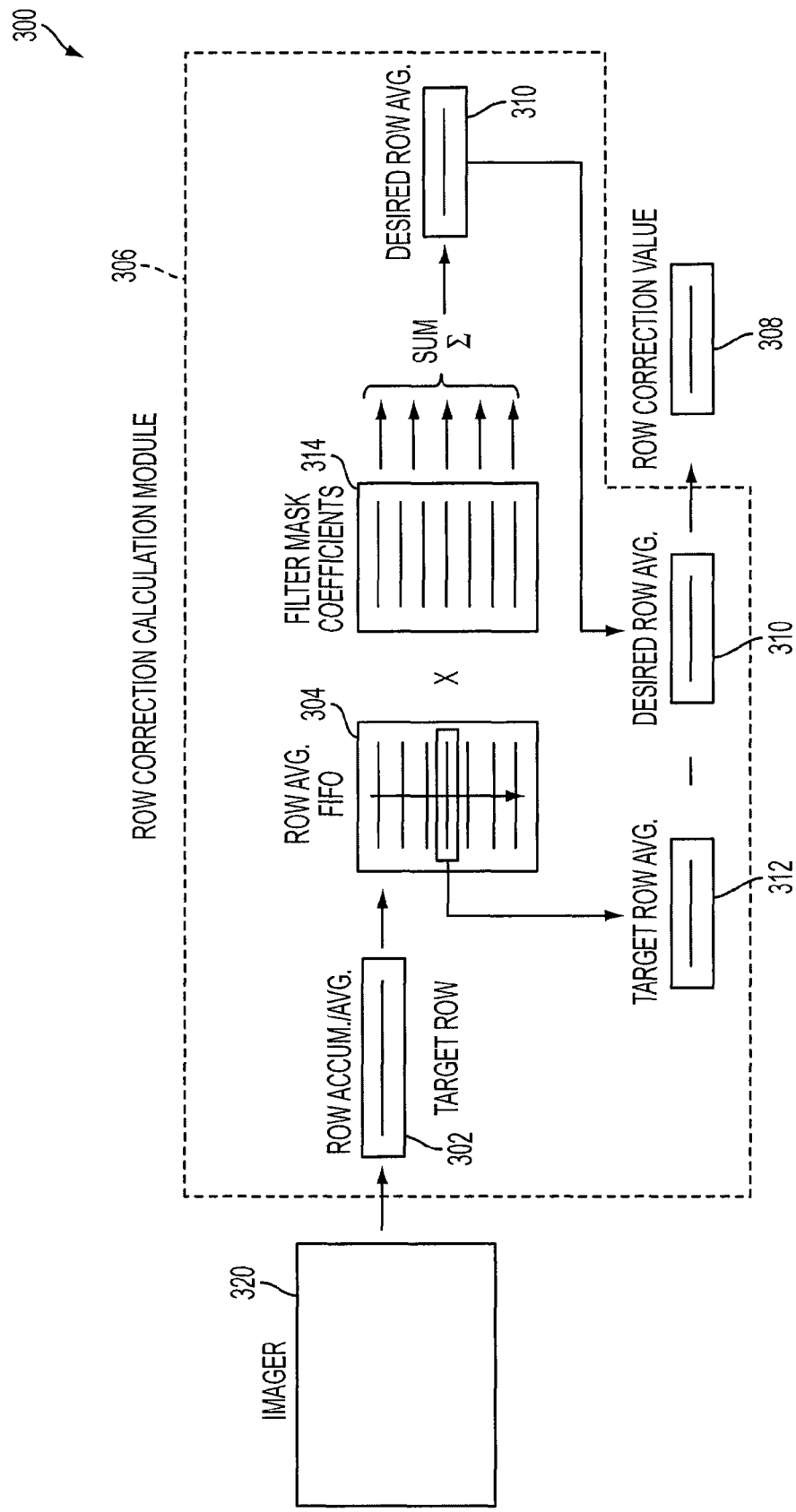
FIG. 3 is a data flow diagram according to an example embodiment of the invention.

A method according to an example embodiment of the invention is described with reference to the flow chart 200 shown in FIG. 2 and the data flow diagram 300 shown in FIG. 3. The data flow diagram 300 in FIG. 3 shows an example row correction calculation module 306. The row correction calculation module 306 receives row data corresponding to each of a plurality of rows of pixels in step 202, directly or indirectly, from the imager 320.

The row correction calculation module 306 includes an averaging module 302. The averaging module 302 generates a row average for each of the plurality of rows based on each row's corresponding row data in step 204. The row averages are stored in a memory 304. The memory 304 may be implemented as a FIFO (first in, first out) where once a row average is no longer needed for generating row correction values, the row average may be discarded to make room in the memory for another row average corresponding to another row for generating another row correction value.

A target row and one or more reference rows are identified by the row correction calculation module 306 from among the plurality of rows in step 206. The target row has corresponding target row data and a corresponding target row average. The one or more reference rows each have corresponding reference row data and a reference row average. The row correction calculation module 306 generates a row correction value 308 based on the target row average of the target row, and the reference row average of each of the one or more reference rows in step 208. The image correction module (e.g., 102 in FIG. 1) may generate corrected target row data (e.g., 110 in FIG. 1) by applying the row correction value 308 to the target row data in step 210.

In the example embodiment shown in FIG. 3, the row correction value 308 is generated by calculating a desired row average value 310 and subtracting the desired row average value 310 from the target row average 312. The desired row average 310 is generated by filtering the target row average and the reference row average(s). The target row average and reference row averages may be filtered by a set of filter mask coefficients 314 to generate the desired row average 310. Example embodiments encompass the filter being FIR or IIR in structure with band-pass, notch, low-pass, or high-pass responses.

Figure 4:
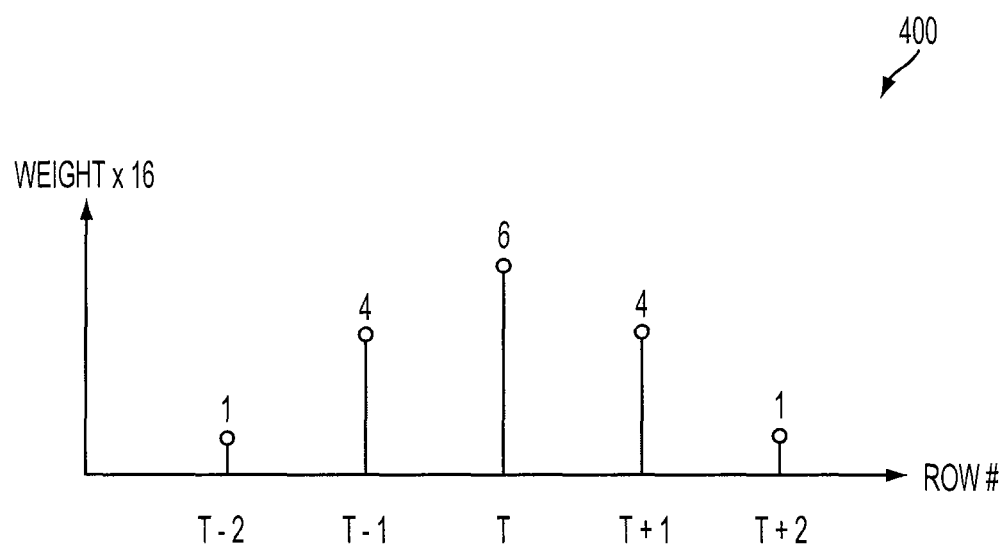
FIG. 4 is a filter mask according to an example embodiment of the invention.

An example of a filter 314 is illustrated by the filter coefficients 400 shown in FIG. 4 for a FIR "low-pass" filter. The row # of T corresponds to the target row and the rows T−2, T−1, T+1 and T+2 correspond to the neighboring reference rows where T−1 and T+1 are adjacent to the target row T and T−2 and T+2 are one row away from the target row T. An example calculation of the desired row average based on the filter mask 400 shown in FIG. 4 is illustrated by the equation [1] below.

$$DesireRowAvg = \frac{(1*Ave_{T-2}) + (4*Ave_{T-1}) + (6*Ave_{T}) + (4*Ave_{T+1}) + (1*Ave_{T+2})}{16} \quad [1]$$

In the equation above, $Ave_i$ designates the row average for row "i." In this example, there are an even number of reference rows (i.e., 4 reference rows) in the target frame and the reference rows symmetrically bound the target row.

Figure 5:
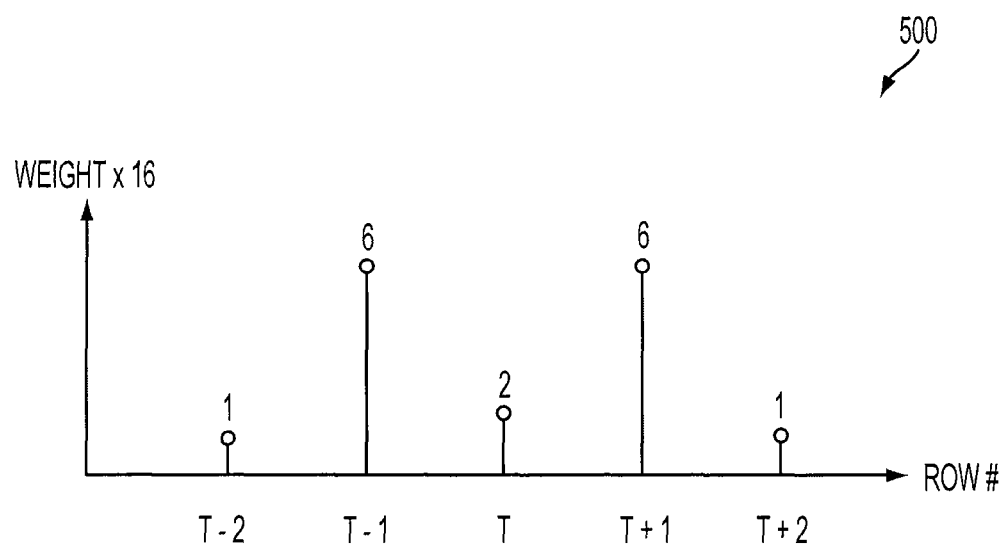
FIG. 5 is a filter mask according to an example embodiment of the invention.

Another example of a filter is illustrated by the filter coefficients 500 shown in FIG. 5 for a "notch" filter. The filter coefficients 500 may be applied to the target row average and the reference row averages in a similar manner to that described above with regard to the filter coefficients 400 shown in FIG. 4. This and other types of filters described could be used to directly calculate a desired row average or a row correction value, to determine whether correction is necessary, or to determine a method of replacing a targeted row, as further described below.

When a target row is adjacent to or near the top or bottom of an image, there many not be any reference rows on one side of the target row corresponding to one or more of the filter coefficients. In such case, in an example embodiment, the existing row averages for the reference rows on the other side of the target row may be substituted for the missing row averages. In another example embodiment, a different filter mask with reference rows on only one side of the target row may be applied when the target row is adjacent or near to the top or bottom of an image. In another example embodiment, the target row average may be substituted for the missing reference row averages. In another example embodiment, the missing reference row averages may be replaced by the average of the top (or bottom, as applicable) five row averages of the previous frame. In another example embodiment, the correction is not calculated for target rows that do not have enough neighboring reference rows and instead begins and ends on a row with enough reference rows to compute the correction filter calculation.

In the example embodiment described with reference to FIG. 3, the target row and the reference rows are in a target frame of a sequence of image frames. In other words, the target and reference rows are in the same image frame. In the example embodiment described below with reference to data flow diagram 600 shown in FIG. 6, the target frame is in a sequence of frames of images and one or more reference rows are located in one or more reference frames preceding the target frame.

The row correction calculation module 606 receives target row data corresponding to a target row of pixels and receives reference row data corresponding to one or more reference rows of pixels, directly or indirectly, from the imager 620. The row correction calculation module 606 includes an averaging module 602. The averaging module 602 generates a target row average based on the received target row data and generates a reference row average for each of the one or more reference rows based on each received reference row's respective row data. The target row average and the reference row average(s) are stored in a memory 604.

Figure 6:
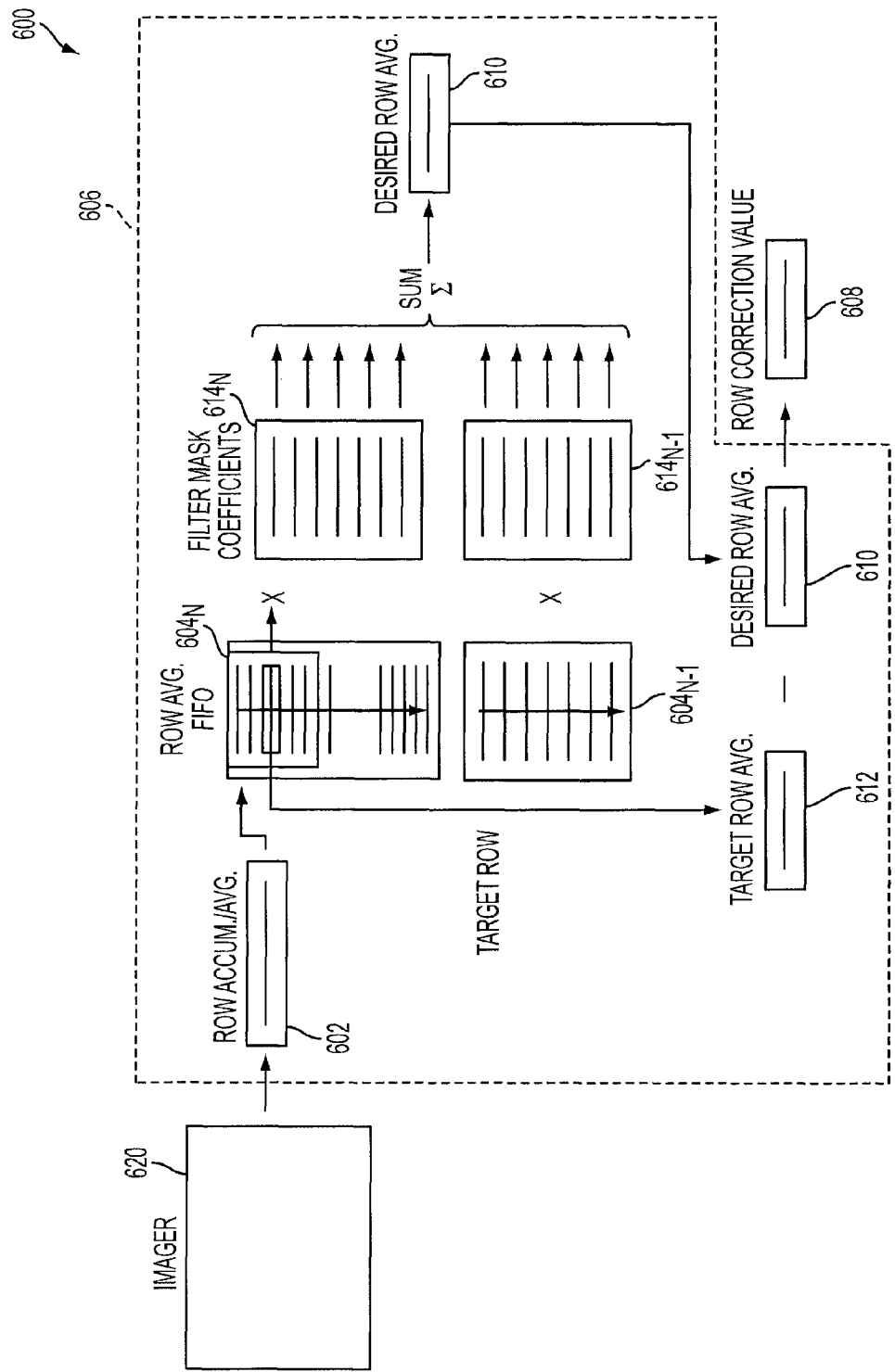
FIGS. 6-7 are data flow diagrams according to example embodiments of the invention.

In the example shown in FIG. 6, the memory $604_N$ stores row averages for the target frame and the memory $604_{N-1}$ stores the row averages for the frame preceding the target frame. The filter mask coefficients $614_N$ and $614_{N-1}$ are applied to the target and reference row averages to generate the desired row average 610. The desired row average 610 is subtracted from the target row average 612 to determine the row correction value 608. The row correction value 608 is subtracted from the target row data to generate the corrected target row data (similar to the method explained above with reference to FIG. 1).

In an example embodiment, one filter mask is applied to the row averages in the target frame and a different filter mask is applied to row averages in the reference frame (s). In another example embodiment, the same filter mask is applied to the target and reference frame(s). An example calculation of the desired row average based on the filter mask 400 shown in FIG. 4 applied to both the target and reference frames in FIG. 6 is illustrated by the equation [2] below.

$$DesiredRowAvg = \frac{\sum_{F=N-x}^{N} (1*Ave_{T-2}) + (4*Ave_{T-1}) + (6*Ave_{T}) + (4*Ave_{T+1}) + (1*Ave_{T+2})}{16*(x+1)} \quad [2]$$

In the equation above, $Ave_i$ designates the row average for row "i," and "x" designates the number of reference frames preceding the target frame. For example, $Ave_T$ for Frame N is the target row average and $Ave_T$ for Frame N−1 is the row average for the same row (i.e., the corresponding row) in the reference frame immediately preceding the target frame. In the example described above with reference to FIG. 6, the value of "x" was one. Example embodiments of the invention encompass values of x greater than one for having multiple reference frames preceding the target frame.

In the example embodiment described above with reference to FIG. 6, the memory 604.sub.N stores the row averages for the target frame and the memory 604.sub.N–1 stores the row averages for the reference frame and the filter mask coefficients are applied to both the target and reference frames. In an example embodiment, the memories only store a sufficient number of row averages of the reference frame(s) needed in order to apply the filter. In other words, the memory 604 does not necessarily store row averages for every row in the target and reference frame(s). For example, if a mask such as that illustrated in FIG. 4 is used for both the target and reference frames, the memory 604 would store row averages corresponding to a number of rows in a frame plus five. As one row average from the target frame is added to the memory in order to generate the row correction value 608 for the next target row, one row average from the reference frame may be replaced. Although the memory is shown as separate devices 604.sub.N and 604.sub.N–1, the memory 604 may be implemented in a single device.

In an example embodiment, the desired row average 610 is generated without filtering the target frame N and using only the reference frame(s) (N–1, N–2, . . . ) preceding the target frame N. For example, the desired row average may be generated based on row averages in one or more reference frames preceding the target frame as illustrated by equation [3] below.

$$DesiredRowAvg = \frac{\sum_{F=N-1-x}^{N-1}(1*Ave_{T-2})+(4*Ave_{T-1})+(6*Ave_T)+(4*Ave_{T+1})+(1*Ave_{T+2})}{16*(x+1)} \quad [3]$$

In the equation above, $Ave_i$ designates the row average for row "i," and "x" designates one less than the number of reference frames preceding the target frame (e.g., x=1 indicates having two reference frames preceding the target frame). In the example described above with reference to FIG. 6, the value of "x" was one. Example embodiments of the invention encompass values of x greater than one for multiple reference frames preceding the target frame.

Figure 7:
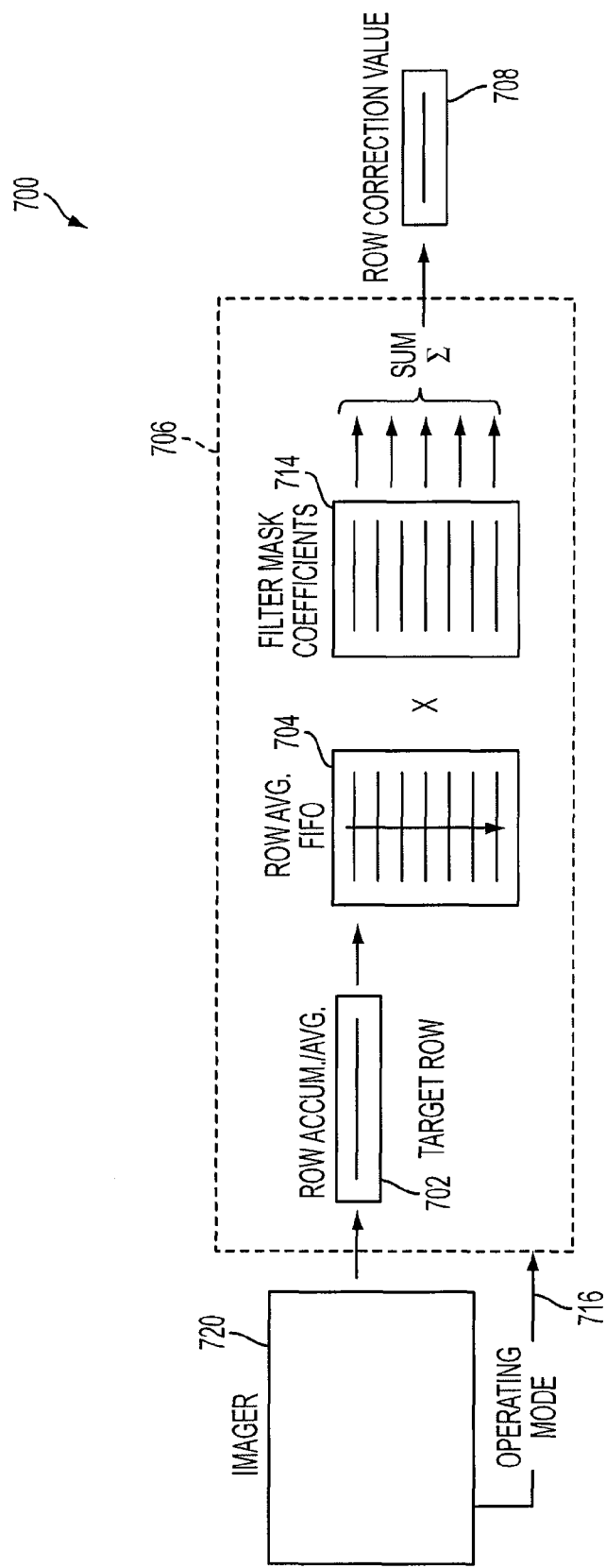

Another example embodiment is described below with reference to data flow diagram 700 shown in FIG. 7. The row correction calculation module 706 receives target row data corresponding to a target row of pixels and receives reference row data corresponding to one or more reference rows of pixels, directly or indirectly, from the imager 720.

The row correction calculation module 706 includes an averaging module 702. The averaging module 702 generates a target row average based on the received target row data and generates a reference row average for each of the one or more reference rows based on each received reference row's respective row data. The target row average and the reference row average(s) are stored in a memory 704.

Figure 8:
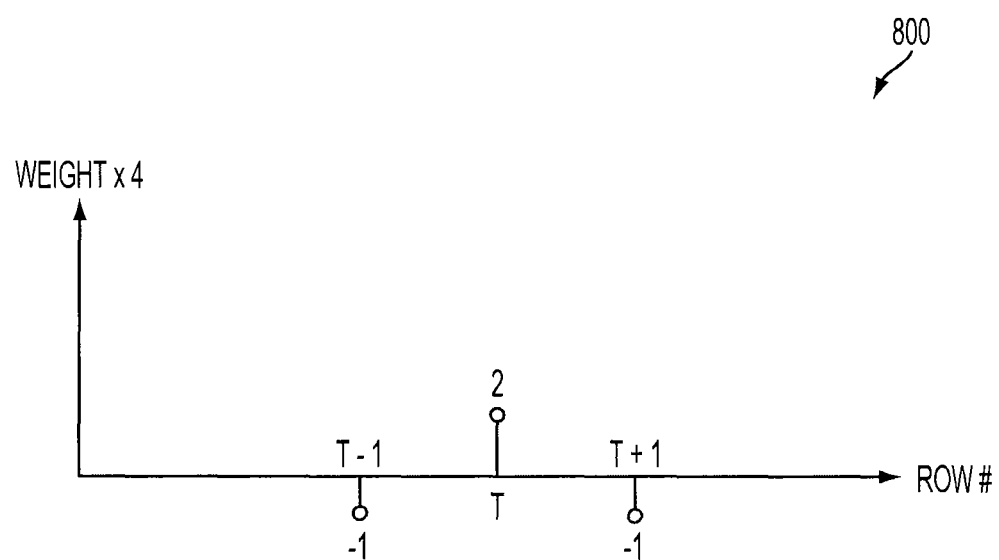
FIG. 8 is a filter mask according to an example embodiment of the invention.

The filter mask coefficients 714 are applied to the target and reference row averages to generate the row correction value 708. The row correction value 708 is subtracted from the target row data to generate the corrected target row data (similar to the method explained above with reference to FIG. 1). In this example embodiment, the filter mask structure is similar to that used in previous examples but the averaging mask is replaced with a differentiating mask. With the differentiating mask, it is not necessary to generate the desired row average and to subtract the desired row average from the target row average to determine the row correction value. An example of a filter 714 is illustrated by the filter coefficients 800 shown in FIG. 8. These filter coefficients result in a high-pass filter that captures the high frequency behavior of the row averages. The filter illustrated by the mask shown in FIG. 8 is a second order differential filter which has a benefit of not responding to linear gradients in row averages.

An imager 720 may have multiple operating modes. In an example embodiment, the row correction calculation module 706 receives a signal indicating the operating mode of the imager 720 and alters one or more of the filter coefficients, the number of rows filtered, and the number of reference frames, responsive to the operating mode of the imager 720. Thus, when the power supply characteristics vary based on a change in operating mode, the generation of a row correction value may be adapted accordingly. Generating a row correction value responsive to the operating mode of the imager is not limited to application in a system illustrated in FIG. 7 and is generally applicable to example embodiments of the invention. In an example embodiment and as shown in FIG. 7, the imager generates the output signal 716 indicating its operating mode which is received by the row correction calculation module 706.

In example embodiments, the width of the filter mask is variable, the coefficients of the filter mask are variable, or both the width and coefficients are variable. A larger filter mask may reject higher spatial frequency noise but may be more susceptible to overcorrection. A smaller filter mask may not reject as much noise but may be less aggressive in its correction. These filter adjustments may be desirable to be tuned responsive to different applications or responsive to different operating modes of an image sensor. Example embodiments encompass having filter widths and filtering coefficients that are identical between the current and previous frames or different between current and previous frames. In an example embodiment, a less wide filter with stronger weighting toward the target row may be used on the target frame as compared to the reference frame(s).

In another example embodiment, an IIR filter is generated by converting a FIR filter mask to an IIR filter mask. This may be accomplished by keeping a history of the filter result and feeding previous filter results back into the filter via additional coefficient paths. The use of an IIR filter may allow for more exotic filter configurations such as higher order filters or filters aimed at passing or rejecting specific row frequencies.

Figure 9:
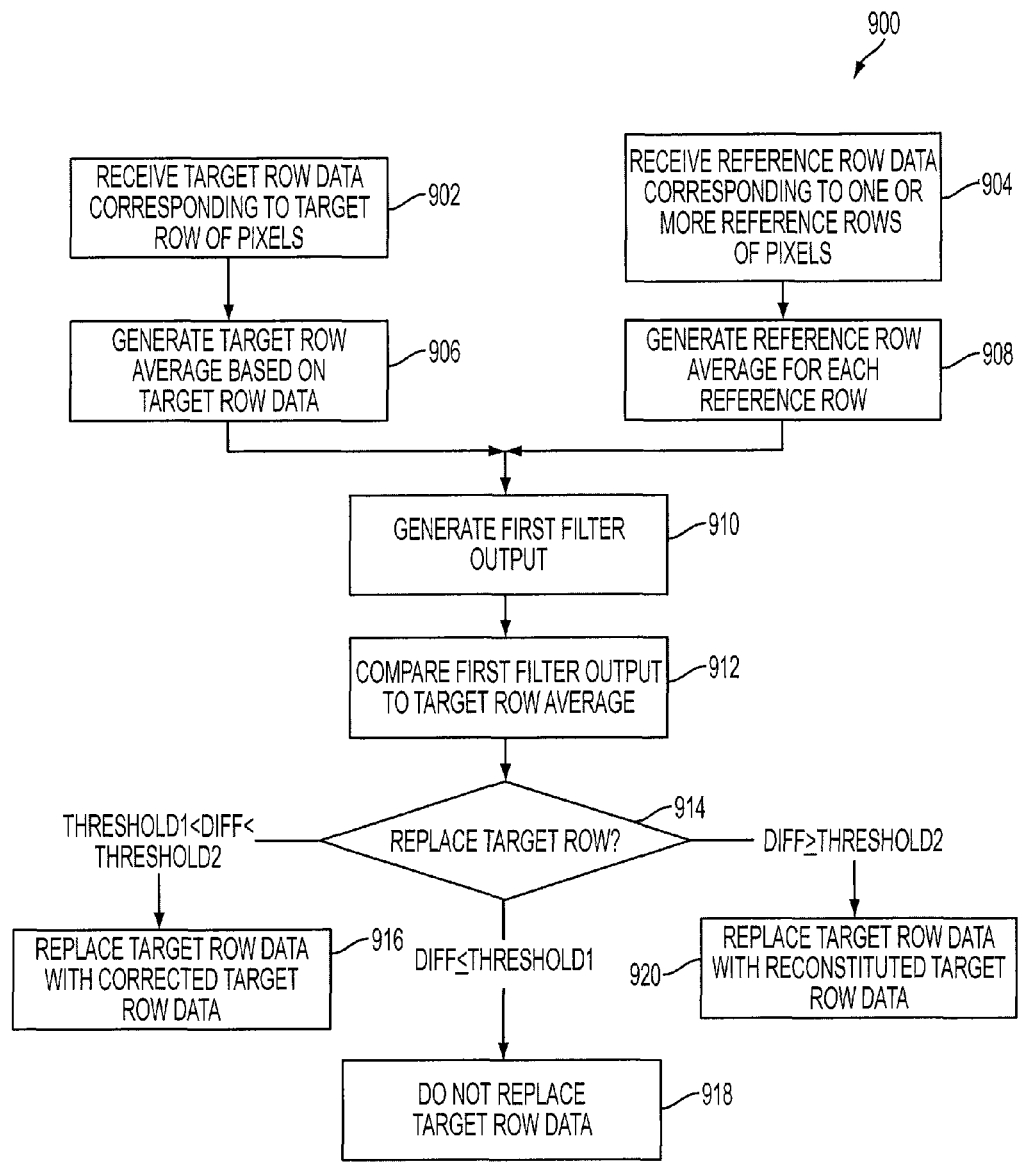
FIG. 9 is a flow chart illustrating a method according to an example embodiment of the invention.

In an example embodiment described with reference to the flow chart 900 shown in FIG. 9, target row data may be replaced with reconstituted target row data rather than applying a row correction value to the target row data. The determination of whether to replace the target row data and the determination of what to replace it with may be based on the target row average and the one or more reference row averages. In steps 902 and 904 the target row data and the reference row data are received. In steps 906 and 908 the target row average and the reference row average(s) are generated. A first filter is applied in step 910 to the target row average and the reference row average(s) to generate a first filter output.

In step 912, the first filter output is compared to the target row average. The first filter output may be a desired row average, for example. In step 914, the result of the comparison is used for determining whether to replace the target row data and, if it is to be replaced, for determining with what to replace the target row data. In an example embodiment, the difference between the first filter output and the target row average is used for the determinations in step 914. If the difference is less than a first threshold (Threshold1), the target row data is not replaced as shown in step 918. If the difference is greater than the first threshold (Threshold 1) but less than a second threshold (Threshold2), the target row data is replaced with corrected target row data as shown in step 916, such as may be generated according to the example embodiments described above. In an example embodiment, a second filter is applied for determining the corrected target row data. If the difference is greater or equal to the second threshold (Threshold2), the target row data may be replaced with reconstituted target row data as shown in step 920. The value of the second threshold may be determined to be a value where the determined level of correction needed for the target row data is so great that it is preferable to instead replace the target row data with reconstituted data rather than correct the current target row data. In an example embodiment, the reconstituted data may be generated using linear or bilinear resampling of adjacent rows.

In example embodiments, before the target row data is replaced in steps 916 or 920, the image data may be analyzed to determine whether the target row data should be replaced to avoid overcorrection. In an example embodiment, an edge detection module determines whether the target row corresponds to an edge transition in the corresponding image and whether the difference exceeding Threshold1 results from the edge transition. If determined to result from the edge transition, the target row data is not replaced and the method does not reach steps 916 and 920. In another example embodiment, the image data may be analyzed to determine whether there is a large sustained step or ramp in row averages. If the difference between the first filter output and the target row average is determined to result from a large sustained step or ramp in the image, the target row data is not replaced and the method does not reach steps 916 and 920. In another example embodiment, a transition level corresponding to a transition between the target row and one or more of the reference rows may be determined based on the target row data and the reference row data. If the transition level indicates a transition in the image that exceeds the transition possible due to limitations of the imager, such as the modulation transfer function (MTF) of the imager, then the method proceeds to steps 916 or 920 to replace the target row data. In an example embodiment, Threshold1 is based on the MTF of the imager the Threshold2 is a predetermined tolerance greater than Threshold1.

Figure 10:
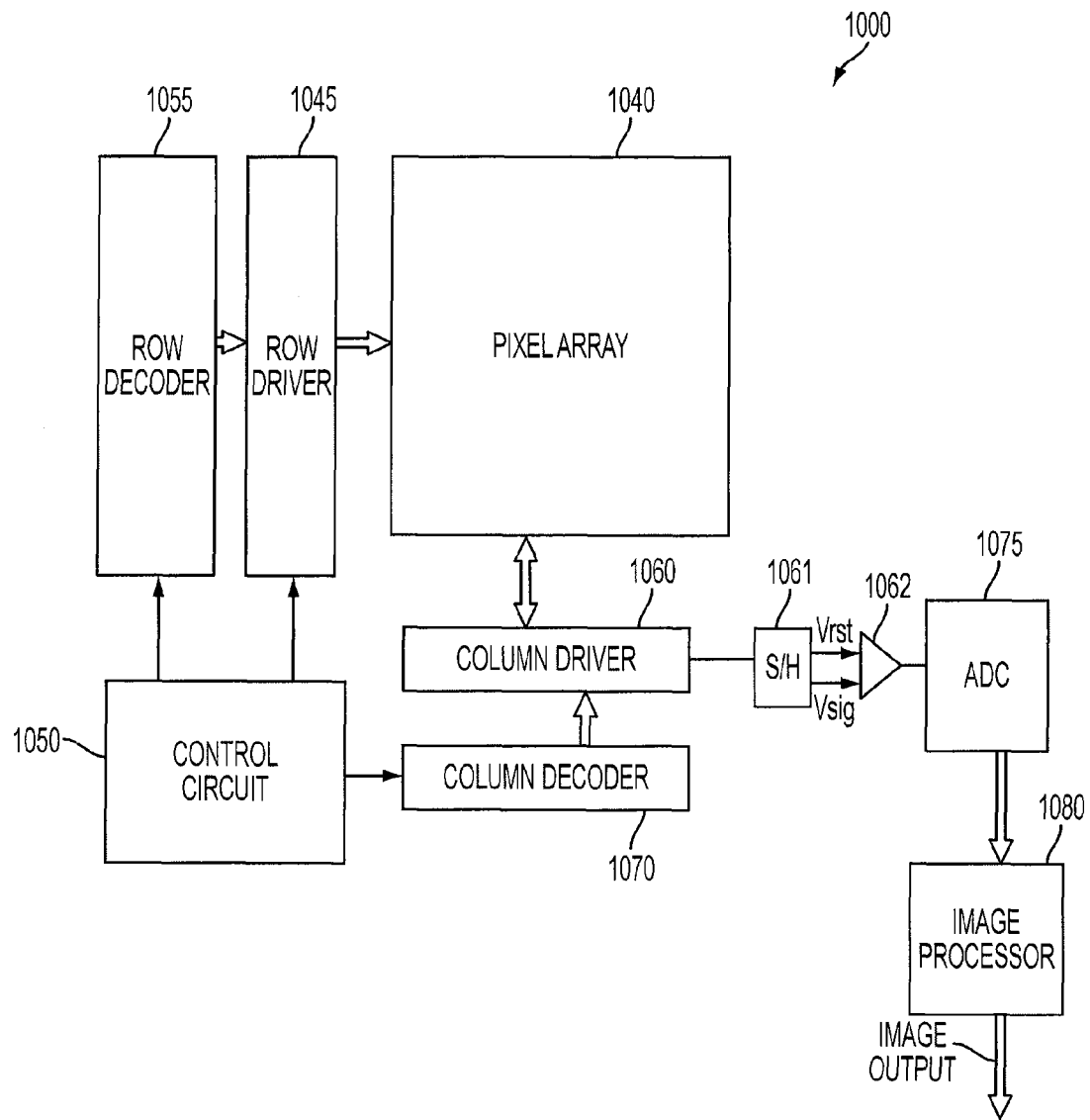
FIG. 10 shows a block diagram of an imager in accordance with an example embodiment of the invention.

FIG. 10 illustrates an exemplary imaging device 1000 having a pixel array 1040. Row lines of the array 1040 are selectively activated by a row driver 1045 in response to row address decoder 1055. A column driver 1060 and column address decoder 1070 are also included in the imaging device 1000. The imaging device 1000 is operated by the timing and control circuit 1050, which controls the address decoders 1055, 1070. The control circuit 1050 also controls the row and column driver circuitry 1045, 1060.

A sample and hold circuit 1061 associated with the column driver 1060 reads a reset pixel signal Vrst and a pixel image signal Vsig for selected pixels of the array 1040. A differential signal (Vrst−Vsig) is produced by differential amplifier 1062 for each pixel in a correlated double sampling (CDS) operation and is digitized by analog-to-digital converter 1075 (ADC). The analog-to-digital converter 1075 supplies the digitized pixel signals to an image processor 1080 which forms and may output a digital image. The image processor 1080 may have a circuit that is capable of performing the methods described.

The imaging device 1000 shown in FIG. 10 has a "serial conversion" architecture. Embodiments of the invention encompass implementing the methods described above with other types of imaging devices. For example, an image processor having a circuit that is capable of performing the methods described above may be implemented in an imaging device having a "parallel conversion" architecture. In such a system, each column has dedicated hardware for the S/H, gain, and ADC functions and the readout from each column is then the digital output of that column's ADC.

Figure 11:
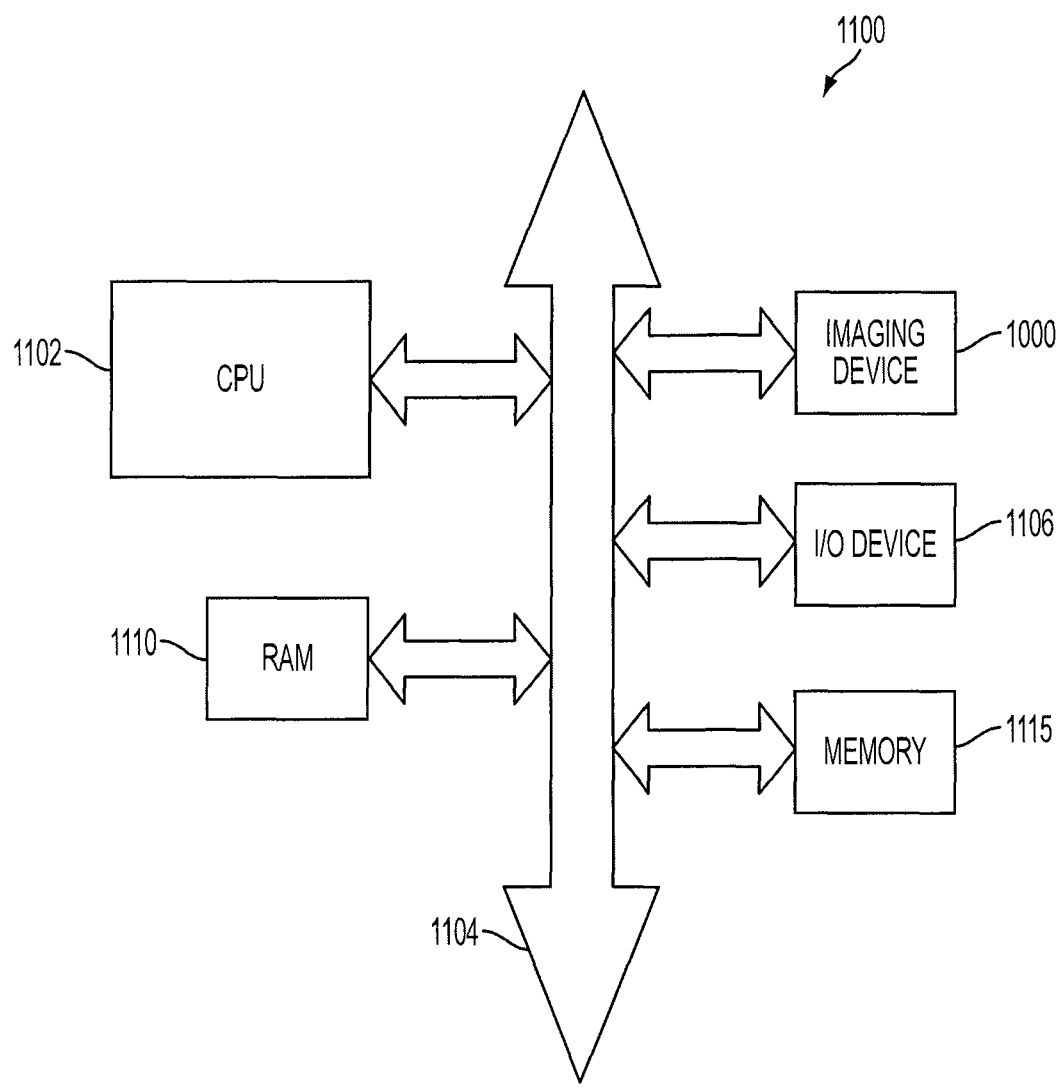
FIG. 11 shows a processor system incorporating at least one imaging device constructed in accordance with an example embodiment of the invention.

FIG. 11 shows system 1100, a typical processor system modified to include the imaging device 1000 (FIG. 10) of the invention. The system 1100 is exemplary of a system having digital circuits that could include image sensor devices. Without being limiting, such a system could include a computer system, still or video camera system, scanner, machine vision, video phone, and auto focus system, or other imager applications.

System 1100, for example a camera system, generally comprises a central processing unit (CPU) 1102, such as a microprocessor, that communicates with an input/output (I/O) device 1106 over a bus 1104. Imaging device 700 also communicates with the CPU 1102 over the bus 1104. The processor-based system 1100 also includes random access memory (RAM) 1110, and can include non-volatile memory 1115, which also communicates with the CPU 1102 over the bus 1104. The imaging device 1000 may be combined with a processor, such as a CPU, digital signal processor, or microprocessor, with or without memory storage on a single integrated circuit or on a different chip than the processor.

In an example embodiment, the filter mask coefficients are dynamically adjusted based on row average differences. For example, a large single row transition may benefit from a notch filter mask 500 such as the example shown in FIG. 5 which reduces the relative weight of the target row in favor of the adjacent rows. Example embodiments of the invention encompass processing and filtering according to the methods described herein on an entire frame at once or sequentially one row at a time during the normal operation of an image sensor.

In one aspect, the invention comprises receiving row data for each of a plurality of adjacent rows of pixels. A row average is generated for each of the plurality of rows based on each row's corresponding row data. A target row is identified among the plurality of rows, the target row having corresponding target row data and a target row average. One or more reference rows are identified among the plurality of rows, each reference row having corresponding reference row data and a reference row average. A row correction value is generated based on the target row average of the target row and the reference row average of each of the one or more reference rows. Corrected target row data is generated by applying the row correction value to the target row data.

In another aspect, the invention comprises receiving target row data corresponding to a target row of pixels and receiving reference row data corresponding to one or more reference rows of pixels. A target row average is generated based on the target row data and a reference row average is generated for each of the one or more reference rows based on each reference row's respective row data. In response to the target row average and the one or more reference row averages, the target row data is selectively replaced with replacement target row data.

According to yet another aspect of the invention, a system for processing image data includes a memory for storing target row data corresponding to a target row of pixels and for storing reference row data corresponding to one or more reference rows of pixels. An image correction module is coupled to the memory for receiving the target row data and reference row data from the memory, the image correction module including an averaging module for generating a target row average based on the target row data and for generating a reference row average for each of the one or more reference rows based on each reference row's respective row data. The image correction module generates corrected target row data based on the target row data, the target row average of the target row, and the reference row average of each of the one or more reference rows.

Although the invention is illustrated and described herein with reference to specific embodiments, the invention is not intended to be limited to the details shown. Rather, various modifications may be made in the details within the scope and range of equivalents of the claims and without departing from the invention. Although the method claims may list steps in a particular order, the scope of a method claim is not limited to a particular order of claimed steps unless the language of the method claims imposes a specific order on the performance of the steps.

What is claimed:

1. A method for processing image data comprising:
   receiving row data for each of a plurality of rows of pixels;
   generating a row average for each of the plurality of rows based on each row's corresponding row data;
   identifying among the plurality of rows, a target row having corresponding target row data and a target row average and one or more reference rows each having corresponding reference row data and a reference row average;
   generating a row correction value based on the target row average of the target row and the reference row average of each of the one or more reference rows;
   generating corrected target row data by applying the row correction value to the target row data, wherein the row correction value is generated by:
     generating a desired row average; and
     subtracting the desired row average from the target row average, and the corrected target row data is generated by subtracting the row correction value from the target row data corresponding to each pixel; and
   filtering the target row average and the reference row averages to generate the desired row average with one of a band-pass filter, a low-pass filter, a high-pass filter, and a notch filter.

2. A method for processing image data comprising:
   receiving row data for each of a plurality of rows of pixels;
   generating a row average for each of the plurality of rows based on each row's corresponding row data;
   identifying among the plurality of rows, a target row having corresponding target row data and a target row average and one or more reference rows each having corresponding reference row data and a reference row average;
   generating a row correction value based on the target row average of the target row and the reference row average of each of the one or more reference rows; and
   generating corrected target row data by applying the row correction value to the target row data, wherein the target row is in a target frame, there are an even number of reference rows in the target frame that symmetrically bound the target row, and the row correction value is generated by filtering the target row average and the reference row averages.

3. The method of claim 2 wherein the target frame is in a sequence of frames, there are reference rows in one or more reference frames preceding the target frame, and the row correction value is generated by filtering the reference row averages of the reference rows in the target frame and in the one or more reference frames preceding the target frame and the target row average.

4. A method for processing image data comprising:
   receiving row data for each of a plurality of rows of pixels;
   generating a row average for each of the plurality of rows based on each row's corresponding row data;
   identifying among the plurality of rows, a target row having corresponding target row data and a target row average and one or more reference rows each having corresponding reference row data and a reference row average;
   generating a row correction value based on the target row average of the target row and the reference row average of each of the one or more reference rows; and
   generating corrected target row data by applying the row correction value to the target row data, wherein the target row is in a target frame of a sequence of frames and the one or more reference rows are in at least one reference frame preceding the target frame in the sequence of frames.

5. The method of claim 4 wherein the target row is located in a position within the target frame and the one or more reference rows are located in one or more positions corresponding to the position of the target row.

6. A method for processing image data comprising:
   receiving row data for each of a plurality of rows of pixels;
   generating a row average for each of the plurality of rows based on each row's corresponding row data;
   identifying among the plurality of rows, a target row having corresponding target row data and a target row average and one or more reference rows each having corresponding reference row data and a reference row average;
   generating a row correction value based on the target row average of the target row and the reference row average of each of the one or more reference rows;
   generating corrected target row data by applying the row correction value to the target row data; and
   applying a differentiating filter mask to the target row average and the reference row averages to generate the row correction value.

7. The method of claim 6 wherein the target row data and the reference row data are generated by an imager, and the row correction value is generated responsive to an operating mode of the imager.

8. A method for processing image data comprising:
   receiving target row data corresponding to a target row of pixels;
   receiving reference row data corresponding to one or more reference rows of pixels;
   generating a target row average based on the target row data;
   generating a reference row average for each of the one or more reference rows based on each reference row's respective row data;
   selectively, in response to the target row average and the one or more reference row averages, replacing the target row data with replacement target row data; and
   filtering the target row average and the reference row averages with a first filter to generate a first filter output, wherein the target row data is selectively replaced with replacement target row data responsive to the first filter output.

9. The method of claim 8 further comprising:
comparing the first filter output to the target row average to generate a difference value, wherein the replacement target row data is corrected target row data if the difference value is between a first threshold value and a second threshold value, and the replacement target row data is reconstituted target row data if the difference value is greater or equal to the second threshold value.

10. The method of claim 8 further comprising:
filtering the target row average and the reference row averages with a second filter to generate a second output value; and
generating the replacement target row data based on the second output value.

11. A method for processing image data comprising:
receiving target row data corresponding to a target row of pixels;
receiving reference row data corresponding to one or more reference rows of pixels;
generating a target row average based on the target row data;
generating a reference row average for each of the one or more reference rows based on each reference row's respective row data;
selectively, in response to the target row average and the one or more reference row averages, replacing the target row data with replacement target row data, wherein the image data is produced by an imaging system having an associated modulation transfer function value;
determining, based on the target row data and the reference row data, a transition level corresponding to a transition between the target row and one or more of the reference rows;
determining whether the transition level exceeds the modulation transfer function value; and
selectively replacing the target row data with the replacement target row data only if the transition level exceeds the modulation transfer function value.

12. A system for processing image data comprising:
a memory storing target row data corresponding to a target row of pixels and storing reference row data corresponding to one or more reference rows of pixels; and
an image correction module coupled to the memory for receiving the target row data and reference row data from the memory, the image correction module including an averaging module for generating a target row average based on the target row data and generating a reference row average for each of the one or more reference rows based on each reference row's respective row data, wherein the image correction module generates corrected target row data based on the target row data, the target row average of the target row, and the reference row average of each of the one or more reference rows, wherein the image correction module comprises:
a filter for filtering the target row average and the reference row averages for generating a desired row average; and
a subtractor module for subtracting the desired row average from the target row data average to generate a row correction value and for subtracting the row correction value from the target row data to generate the corrected target row data.

13. The system of claim 12 wherein the target row data and the reference row data are generated by an imager and the image correction module is coupled to the imager for receiving a signal identifying an operating mode of the imager and the image correction module generates a row correction value responsive to the operating mode of the imager.

14. A system for processing image data comprising:
a memory storing target row data corresponding to a target row of pixels and storing reference row data corresponding to one or more reference rows of pixels; and
an image correction module coupled to the memory for receiving the target row data and reference row data from the memory, the image correction module including an averaging module for generating a target row average based on the target row data and generating a reference row average for each of the one or more reference rows based on each reference row's respective row data, wherein the image correction module generates corrected target row data based on the target row data, the target row average of the target row, and the reference row average of each of the one or more reference rows, wherein the memory stores data corresponding to a target frame of a sequence of frames and corresponding to at least one reference frame preceding the target frame in the sequence of frames, and the target row is in the target frame and the reference rows are in the at least one reference frame.

* * * * *